(12) United States Patent
Shiohara et al.

(10) Patent No.: US 11,392,330 B2
(45) Date of Patent: Jul. 19, 2022

(54) MANAGEMENT SERVER SYSTEM, AND CONTROL METHOD FOR SAVING FIRST AND SECOND PRINTERS INFORMATION STORED IN FIRST AND SECOND SERVERS IN ASSOCIATION WITH OTHER INTO THE MANAGEMENT SERVER SYSTEM

(71) Applicant: CANON KABUSHIKI KAISHA, Tokyo (JP)

(72) Inventors: Tetsuya Shiohara, Kanagawa (JP); Keiji Kawasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/404,593

(22) Filed: Aug. 17, 2021

(65) Prior Publication Data

US 2022/0066707 A1    Mar. 3, 2022

(30) Foreign Application Priority Data

Aug. 26, 2020 (JP) .............................. JP2020-142846

(51) Int. Cl.
*G06F 3/12* (2006.01)

(52) U.S. Cl.
CPC .......... *G06F 3/1204* (2013.01); *G06F 3/1238* (2013.01); *G06F 3/1255* (2013.01); *G06F 3/1257* (2013.01); *G06F 3/1231* (2013.01); *G06F 3/1287* (2013.01); *G06F 3/1288* (2013.01)

(58) Field of Classification Search
None
See application file for complete search history.

(56) References Cited

U.S. PATENT DOCUMENTS

| 8,724,144 B2* | 5/2014 | Tonegawa | H04N 1/4433 358/1.15 |
|---|---|---|---|
| 2015/0015908 A1 | 1/2015 | Tanaka | |
| 2015/0181060 A1* | 6/2015 | Miyazawa | H04N 1/00411 358/1.15 |
| 2015/0277816 A1* | 10/2015 | Adachi | H04L 63/083 358/1.15 |
| 2018/0095396 A1* | 4/2018 | Sun | G06F 3/1231 |
| 2019/0294387 A1* | 9/2019 | Sako | G06F 3/1204 |
| 2020/0073604 A1* | 3/2020 | Oikawa | G06F 3/1292 |

FOREIGN PATENT DOCUMENTS

JP    6672596 B2    3/2020

* cited by examiner

*Primary Examiner* — Haris Sabah
(74) *Attorney, Agent, or Firm* — Canon U.S.A., Inc. IP Division

(57) ABSTRACT

A first server system includes a registration unit configured to, in a case where a request output from a management server system based on an instruction from a first user having a first authority is received, register first printer information in the first server system, and the management server system includes a control unit configured to, based on an instruction from a second user having a second authority that is a more limited authority than the first authority, execute a saving process for saving the first printer information registered in the first server system and second printer information regarding a printing apparatus registered in a second server system different from the first server system and the management server system in association with each other in a saving unit of the management server system.

8 Claims, 12 Drawing Sheets

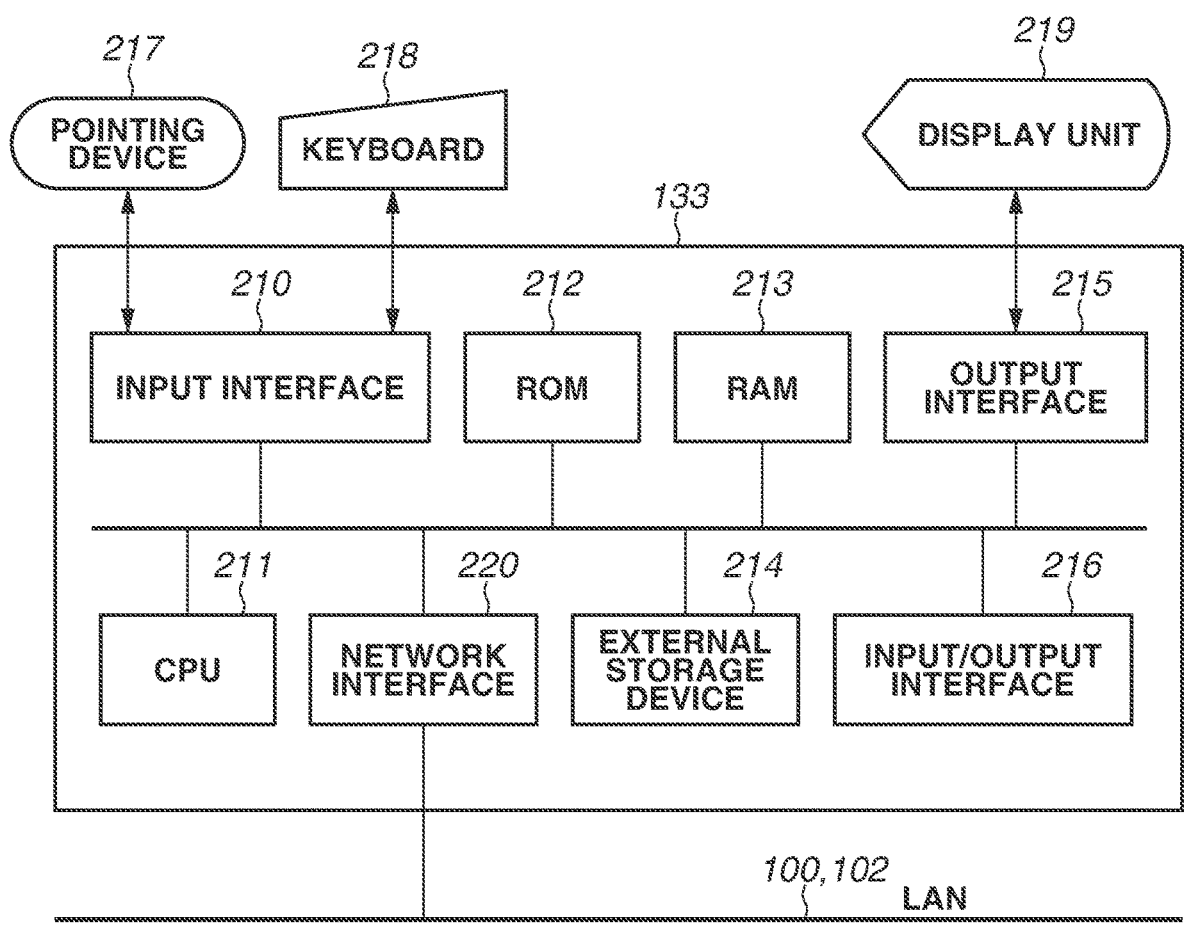

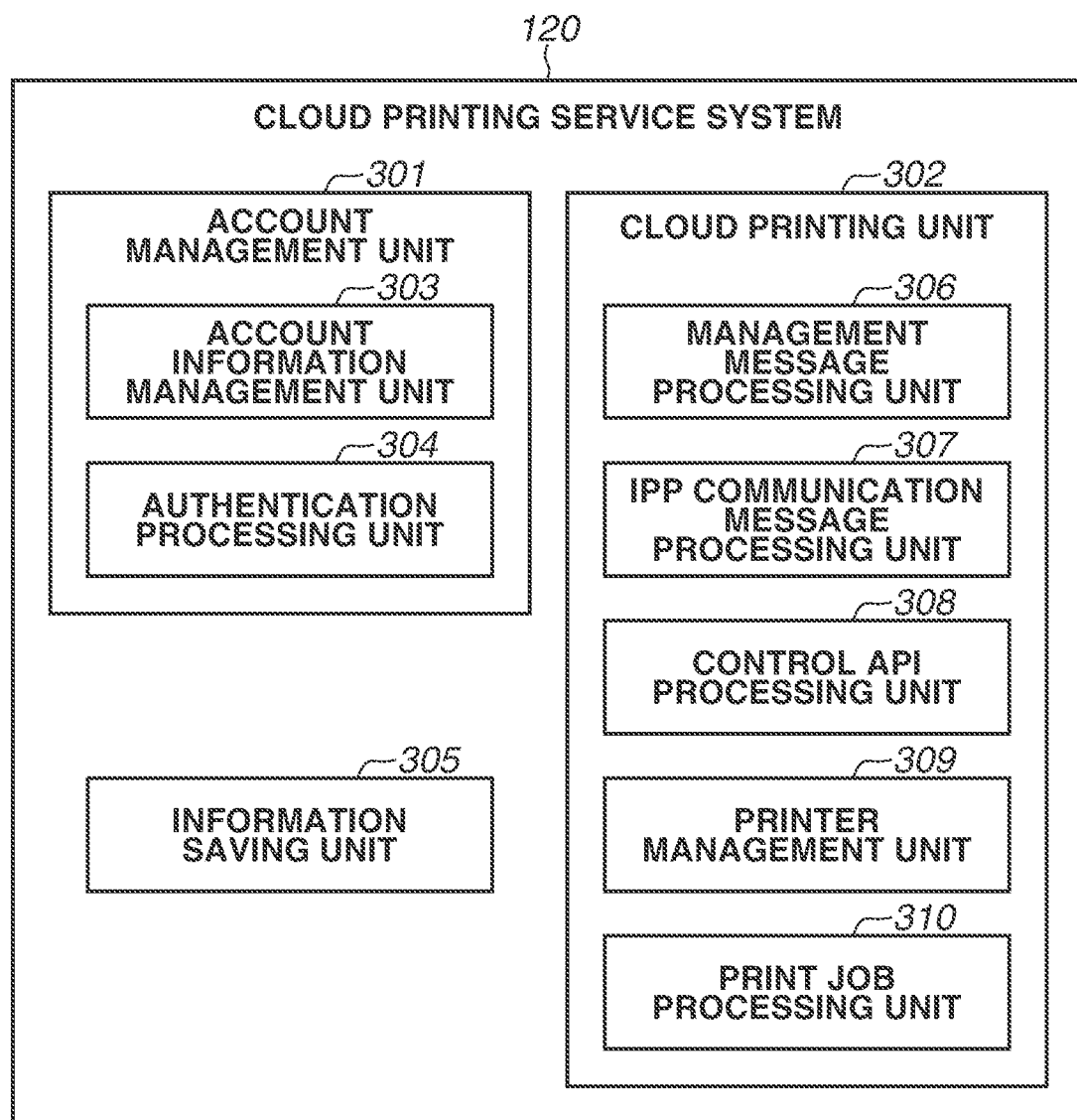

FIG.4

| Classification | Setting | Value |
|---|---|---|
| General Information | Tenant Name | XYCompany |
| | Administrator Name ~401 | Admin |
| Information Regarding Printer 1 | Printer Name ~402 | XYCompany Printer 1 |
| | Device ID ~403 | BA4CC831-AC59-4660-803F-B5A11AF8CC33 |
| | Shared Setting ~404 | Shared |
| | Initial Settings ~405 | 2-up, monochrome |
| | User ~406 | UserA, UserB |
| | Printer Capability ~407 | PaperSize: A3, A4...<br>Media Type: Plain...<br>... |
| | Printer Status ~408 | Idle |
| Information Regarding Printer 2 | Printer Name | XYCompany Printer 2 |
| | Device ID | CEA8220B-FCF0-48FC-B3E5-52FC8876F07A |
| | Shared Setting | Not Shared |
| | Initial Settings | Duplex |
| | User | None |
| | Printer Capability | Paper Size: A4, Letter...<br>Media Type: Plain, Photo...<br>Duplex: on, off<br>... |
| | Printer Status | No Paper |

FIG.11A

```
Administrator Menu                                    1101

■ List of Registered Printers
  XYZCompany Printer 1    [ Delete ]
                                              1111
■ Addition of Printer
  Printer Name    [ XYZCompany Printer 2 ]

[ Add ] ~1112
```

FIG.11B

```
                                                      1102
User Menu
                              1121         1122
■ List of Available Printers
  XYZCompany Printer 1    [ Edit ]    [ Print ]
  XYZCompany Printer 2    [ Edit ]    [ Print ]
```

FIG.11C

```
                                                      1103
User Menu

■ Registration of Printer
  Please Select Printer to Be Used in
  XYZCompany Printer 1

⦿ Printer A
  ○ Printer B
                                              1131
                            [ Cancel ]    [ OK ]
```

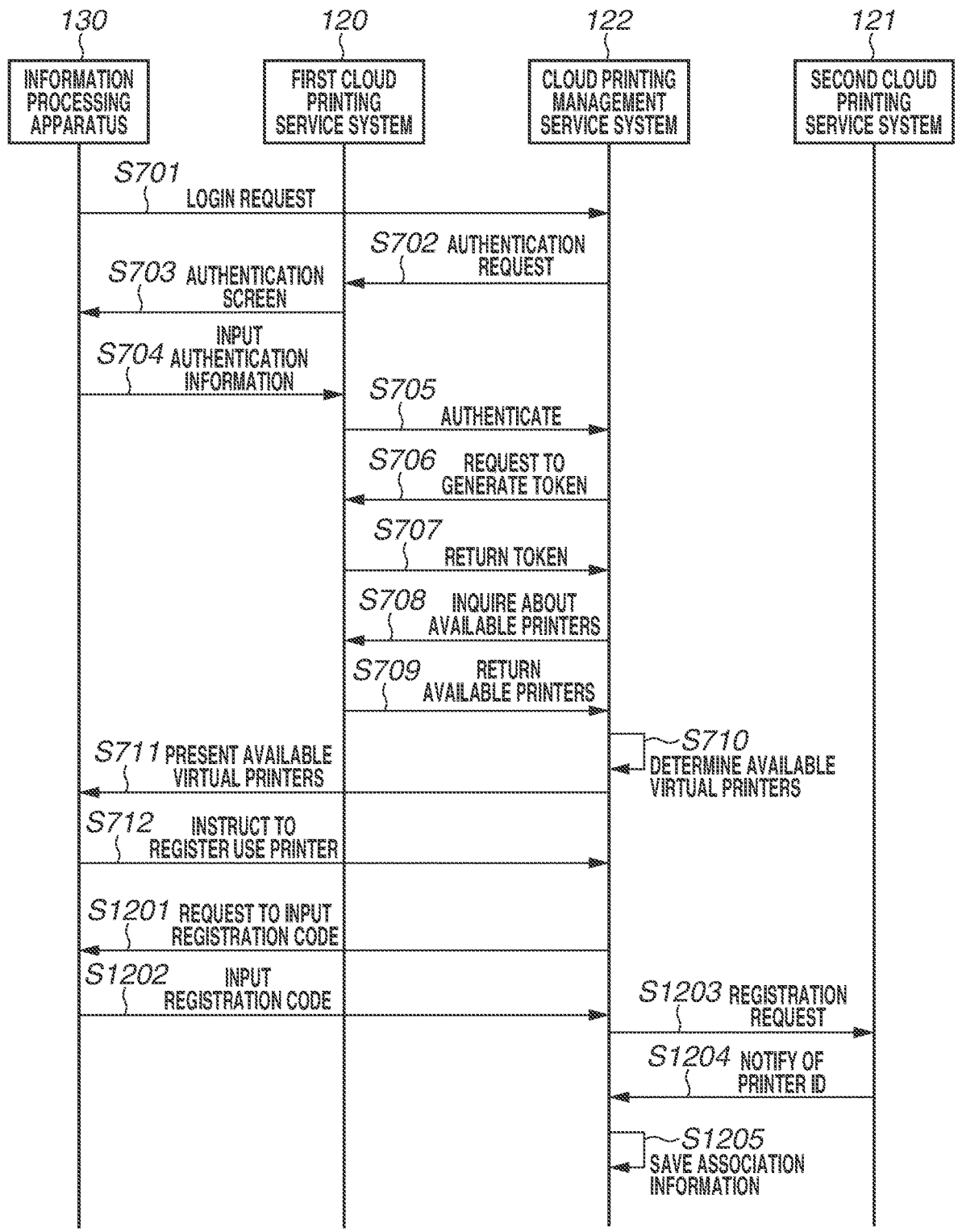

MANAGEMENT SERVER SYSTEM, AND CONTROL METHOD FOR SAVING FIRST AND SECOND PRINTERS INFORMATION STORED IN FIRST AND SECOND SERVERS IN ASSOCIATION WITH OTHER INTO THE MANAGEMENT SERVER SYSTEM

BACKGROUND

Field of the Disclosure

The present disclosure relates to a printing system, a management server system, and a printing apparatus.

Description of the Related Art

There is known a configuration in which an information processing apparatus such as a personal computer (PC) executes printing via a server on a cloud. Specifically, the information processing apparatus issues a print request to a cloud printing service system configured on the cloud and transmits the print request to a printing apparatus associated with the information processing apparatus on the cloud printing service system. In a case where a plurality of users uses a single printing apparatus in a shared manner, it is necessary to register the plurality of users as users of the printing apparatus registered in the cloud printing service system. Japanese Patent No. 6672596 discusses a configuration in which an administrator identification (ID) for using a cloud printing service is held in advance in a printing apparatus, thereby easily adding a user of the printing apparatus on the cloud printing service system.

SUMMARY

According to embodiments of the present disclosure, a printing system includes a first server system and a management server system. The first server system comprises a registration unit configured to, in a case where a request output from the management server system based on an instruction from a first user having a first authority is received, register first printer information in the first server system, and the management server system includes a control unit configured to, based on an instruction from a second user having a second authority that is a more limited authority than the first authority, execute a saving process for saving the first printer information registered in the first server system and second printer information regarding a printing apparatus registered in a second server system different from the first server system and the management server system in association with each other in a saving unit of the management server system, and a print job output from an information processing apparatus having received a print instruction from the second user can be received by the printing apparatus via the first server system and the second server system, by executing the saving process.

Further features of the present disclosure will become apparent from the following description of exemplary embodiments with reference to the attached drawings.

BRIEF DESCRIPTION OF THE DRAWINGS

FIG. 2 is a block diagram illustrating a hardware configuration of an information processing apparatus and a cloud printing service system.

FIG. 3 is a functional block diagram illustrating a software configuration of the cloud printing service system.

FIG. 4 is a table illustrating examples of various pieces of setting information managed by a first cloud printing service.

FIGS. 11A, 11B, and 11C are diagrams illustrating a front end of the cloud printing management service.

FIG. 12 is a sequence diagram illustrating a flow of associating a virtual printer and a printer registered in a second cloud printing service.

DESCRIPTION OF THE EMBODIMENTS

Figure 1:
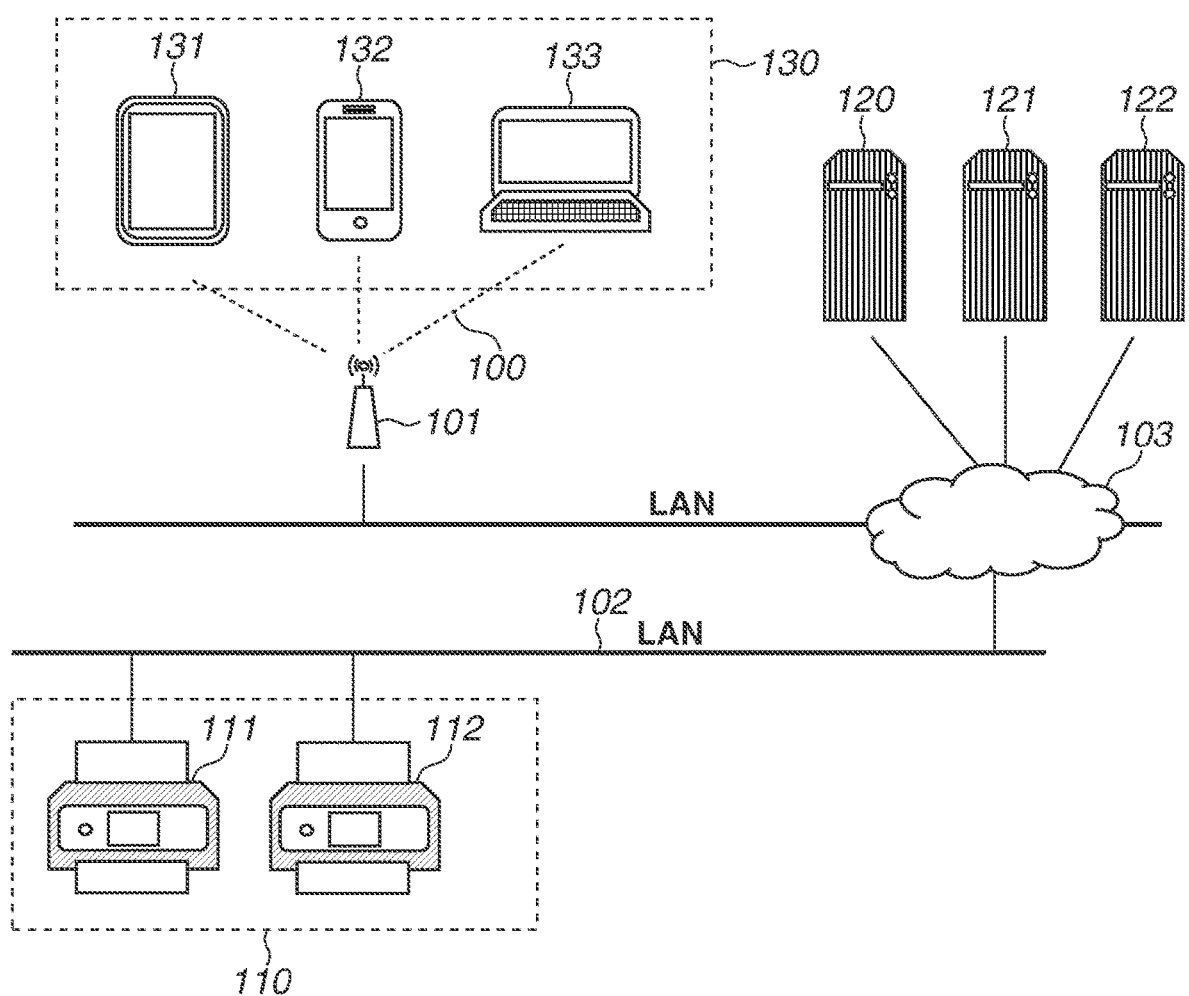
FIG. 1 is a diagram illustrating a configuration of a printing system.

In recent years, with a growing need to work at home, there is a case where a user wishes to use a printing apparatus of the user's home by newly registering the printing apparatus in a cloud printing service system to print a business material at home. This case applies not only to the cloud printing server system, and a similar case can also apply to another printing server system. Embodiments of the present disclosure are directed to providing a technique for enabling the use of a printing apparatus via a printing server system.

With reference to the attached drawings, exemplary embodiments of the present disclosure will be described in detail below. The following exemplary embodiments do not limit the present disclosure, and not all the combinations of the features described in the exemplary embodiments are essential for a method for solving the issues in the present disclosure. The same components are designated by the same reference numerals, and are not repeatedly described.
<Configuration of Printing System>

FIG. 1 is a diagram illustrating a configuration of a printing system according to a first exemplary embodiment of the present disclosure. To a local area network (LAN) 102, printing apparatuses 111 and 112 are connected. The printing apparatuses 111 and 112 are sometimes referred to as a "printing apparatus 110" collectively.

The printing apparatus 111 is a printing apparatus that supports printing based on the Internet Printing Protocol (IPP) specification and a standard specification for cloud printing. The printing apparatus 111 supports printing based on a cloud printing function based on a standard specification for executing cloud printing, termed the IPP Shared Infrastructure Extensions (hereinafter referred to as "IPP-Infra"), as an example of the standard specification for cloud printing. On the other hand, assume that the printing apparatus 112 does not support printing based on the standard specification for cloud printing, but supports a unique cloud printing service provided by a printer vendor. Although the printing apparatus 110 is described using as an example an inkjet printer that performs printing by discharging ink onto a paper surface, printing may be executed using another method (e.g., an electrophotographic method).

To a LAN 100 constructed by an access point (AP) 101, a tablet 131, a smartphone 132, and an information processing apparatus (personal computer) 133 are connected. Hereinafter, the tablet 131, the smartphone 132, and the information processing apparatus 133 are sometimes referred to as an "information processing apparatus 130" collectively. The LANs 100 and 102 are connected to the Internet 103. To the Internet 103, a first cloud server system (hereinafter, "first cloud printing service system") 120 is connected, which provides a printing service having a management function executed by an administrator on a cloud. To the Internet 103, a second cloud server system (hereinafter, "second cloud printing service system") 121 is also connected, which is provided by the printer vendor and provides a printing service on the cloud available to a user who has purchased a printer. Additionally, to the Internet 103, a management cloud server system (hereinafter, "cloud printing management service system") 122 as a management server system is connected.

The information processing apparatus 130 can communicate with the first cloud printing service system 120, the second cloud printing service system 121, and the cloud printing management service system 122 via the Internet 103. The printing apparatus 111 can communicate with the first cloud printing service system 120 via the Internet 103. The printing apparatus 112 can communicate with the second cloud printing service system 121 via the Internet 103.

The first cloud printing service system 120 supports a cloud printing function based on the IPP-Infra as an example of a standard specification for a cloud printing system. The first cloud printing service system 120 primarily saves print data based on the IPP specification. Then, in response to a request from the printing apparatus 111 supporting cloud printing based on the IPP-Infra specification, the first cloud printing service system 120 can transmit the print data to the printing apparatus 111 based on the IPP-Infra specification.

In an operating system (OS) in the information processing apparatus 130, a program termed an "IPP-Client module" capable of generating print data based on the IPP specification is provided as standard. The information processing apparatus 130 can generate print data based on the IPP specification using the IPP-Client module. If the information processing apparatus 130 transmits a print job to the first cloud printing service system 120 in response to a print instruction from a user, the first cloud printing service system 120 reserves the print job on the cloud.

If the print job is saved in the first cloud printing service system 120, the printing apparatus 111, which is a printing apparatus supporting cloud printing based on the IPP-Infra specification, requests the print job from the first cloud printing service system 120. The printing apparatus 111 may periodically request the first cloud printing service system 120 to acquire the print job. Alternatively, a configuration may be employed in which when the user gives an instruction to acquire the print job on the printing apparatus 111, the printing apparatus 111 requests the first cloud printing service system 120 to acquire the print job. Yet alternatively, a configuration may be employed in which if the print job is saved in the first cloud printing service system 120, the first cloud printing service system 120 issues to the printing apparatus 111 a notification indicating that the print job is saved in the first cloud printing service system 120. In this case, if the printing apparatus 111 receives the notification indicating that the print job is saved, the printing apparatus 111 requests the first cloud printing service system 120 to acquire the print job.

The cloud printing service system 120 receives the request from the printing apparatus 111 and transmits the print job reserved in the first cloud printing service system 120 to the printing apparatus 111. In this way, the printing apparatus 111 acquires the print job and executes printing.

To use the first cloud printing service system 120, a user having an administrator authority on the first cloud printing service system 120 (hereinafter also referred to as an "administrator") needs to register the printing apparatus 111 in the first cloud printing service system 120. More specifically, by operating the printing apparatus 111 in advance, the user executes the process of registering the printing apparatus 111 in the first cloud printing service system 120.

In the present exemplary embodiment, it is also possible to register a virtual printer in the first cloud printing service system 120. A registration process for registering the virtual printer will be described below with reference to FIG. 5.

The second cloud printing service system 121 is a cloud printing service system provided by the printer vendor. The printing apparatus 112 supports the unique printing service provided by the printer vendor and therefore can receive a print job from the second cloud printing service system 121. To use the second cloud printing service system 121, the user needs to register the printing apparatus 112 in the second cloud printing service system 121 by operating the printing apparatus 112 in advance. In this way, the user can instruct the printing apparatus 112 registered in the second cloud printing service system 121 to perform printing via the second cloud printing service system 121.

The cloud printing management service system 122 assumes the role of a bridge between the first cloud printing service system 120 and the second cloud printing service system 121. The cloud printing management service system 122 requests the first cloud printing service system 120 to register in the first cloud printing service system 120 a virtual printer that behaves as a printer compatible with (supporting) the first cloud printing service system 120. Then, the cloud printing management service system 122 performs a process for associating the virtual printer registered in the first cloud printing service system 120 with a printer (printing apparatus 112 in this case) registered in the second cloud printing service system 121. In this way, the user can select the virtual printer registered in the first cloud printing service system 120 to give a printing instruction to the virtual printer, whereby the printing apparatus 112 can execute printing. More specifically, the cloud printing management service system 122 acquires from the first cloud printing service system 120 a print job received by the virtual printer and transmits the print job to the second cloud printing service system 121. Then, the second cloud printing service system 121 transmits the print job to the printing apparatus 112, whereby the printing apparatus 112 can perform printing.

A description is given of an example in which each of the first cloud printing service system 120, the second cloud printing service system 121, and the cloud printing management service system 122 according to the present exemplary embodiment is composed of a single server. Alternatively, each service system may be configured to execute its function by a plurality of servers on the cloud operating cooperatively with each other. Alternatively, the service system may be a server apparatus on a local network. The present exemplary embodiment is described using the above example configuration as an example of the configuration of the printing system. The present disclosure, however, is not limited to this. The information processing apparatus 130, the first cloud printing service system 120, the second cloud printing service system 121, the cloud printing management service system 122, and the printing apparatus 112 only need to be connected together via a network so that these apparatuses can communicate with each other. The network may be a wireless network or a wired network.

<Hardware Configurations of Information Processing Apparatus and Cloud Printing Service Systems>

FIG. 2 is a block diagram illustrating a hardware configuration of an information processing apparatus 133. The information processing apparatus 133 in FIG. 2 is a PC as an example of the information processing apparatus 130 and includes an input interface 210, a central processing unit (CPU) 211, a read-only memory (ROM) 212, a random-access memory (RAM) 213, an external storage device 214, an output interface 215, and an input/output interface 216. To the input interface 210, input devices such as a keyboard 218 and a pointing device 217 is connected. To the output interface 215, a display device such as a display unit 219 is connected.

The ROM 212 stores an initialization program. The external storage device 214 stores a group of application programs, an OS, and various other types of data. The RAM 213 is used as a work memory when various programs stored in the external storage device 214 are executed. The information processing apparatus 130 is connected to the LAN 100 via a network interface (I/F) 220.

The hardware configuration of each of the tablet 131, the smartphone 132, the first cloud printing service system 120, the second cloud printing service system 121, and the cloud printing management service system 122 is also similar to the hardware configuration of the information processing apparatus 133 illustrated in FIG. 2, and therefore is not described.

<Software Configurations of Cloud Printing Service Systems>

FIG. 3 is a functional block diagram illustrating a software configuration of the first cloud printing service system 120 according to the present exemplary embodiment. In the following description, each piece of software and each functional block may be described to perform each process, but actually, each function is achieved by the CPU 211 executing a corresponding program.

The first cloud printing service system 120 includes an account management unit 301 and a cloud printing unit 302. The account management unit 301 includes an account information management unit 303 and an authentication processing unit 304. The account information management unit 303 manages user information regarding a user who uses the first cloud printing service system 120. The user information is stored in an information saving unit 305. The authentication processing unit 304 verifies the validity of an account and a password, and issues a token indicating authority information regarding authority to access the first cloud printing service system 120.

The cloud printing unit 302 includes a management message processing unit 306, an IPP communication message processing unit 307, a control application programming interface (API) processing unit 308, a printer management unit 309, and a print job processing unit 310. The management message processing unit 306 receives, generates, and transmits a management message based on the specifications of the first cloud printing service system 120. The IPP communication message processing unit 307 receives, generates, and transmits an IPP communication message. The control API processing unit 308 receives a control API and executes processing based on a request or changes various settings. The printer management unit 309 manages a printer registered in the first cloud printing service system 120. Various pieces of information regarding the printer are stored in the information saving unit 305. The print job processing unit 310 saves and edits a print job issued to the first cloud printing service system 120 and received by the IPP communication message processing unit 307. In response to a request involved in an acquisition request to acquire a print job that is received by the IPP communication message processing unit 307, the print job processing unit 310 passes the print job to the IPP communication message processing unit 307.

With the above configuration, the first cloud printing service system 120 assumes the role of a server in cloud printing based on the IPP-Infra specification. In the first cloud printing service system 120, a plurality of printers can be registered using the printer management unit 309. In the first cloud printing service system 120, a virtual printer can also be registered based on a request from the cloud printing management service system 122. The first cloud printing service system 120 includes the account management unit 301 and thus functions also as a directory service that manages a user of a cloud service. The account management unit 301 and the cloud printing unit 302 may be configured as separate services.

The software configuration of the second cloud printing service system 121 is similar to the software configuration of the first cloud printing service system 120 illustrated in FIG. 3. However, in a case where a protocol used by the second cloud printing service system 121 is different from that of the first cloud printing service system 120, a communication message processing unit of the second cloud printing service system 121 has a different configuration from that of the IPP communication message processing unit 307 of the first cloud printing service system 120. Thus, the communication message processing unit of the second cloud printing service system 121 processes data based on the protocol used by the second cloud printing service system 121.

<Software Configuration of Cloud Printing Management Service System>

Figure 10:
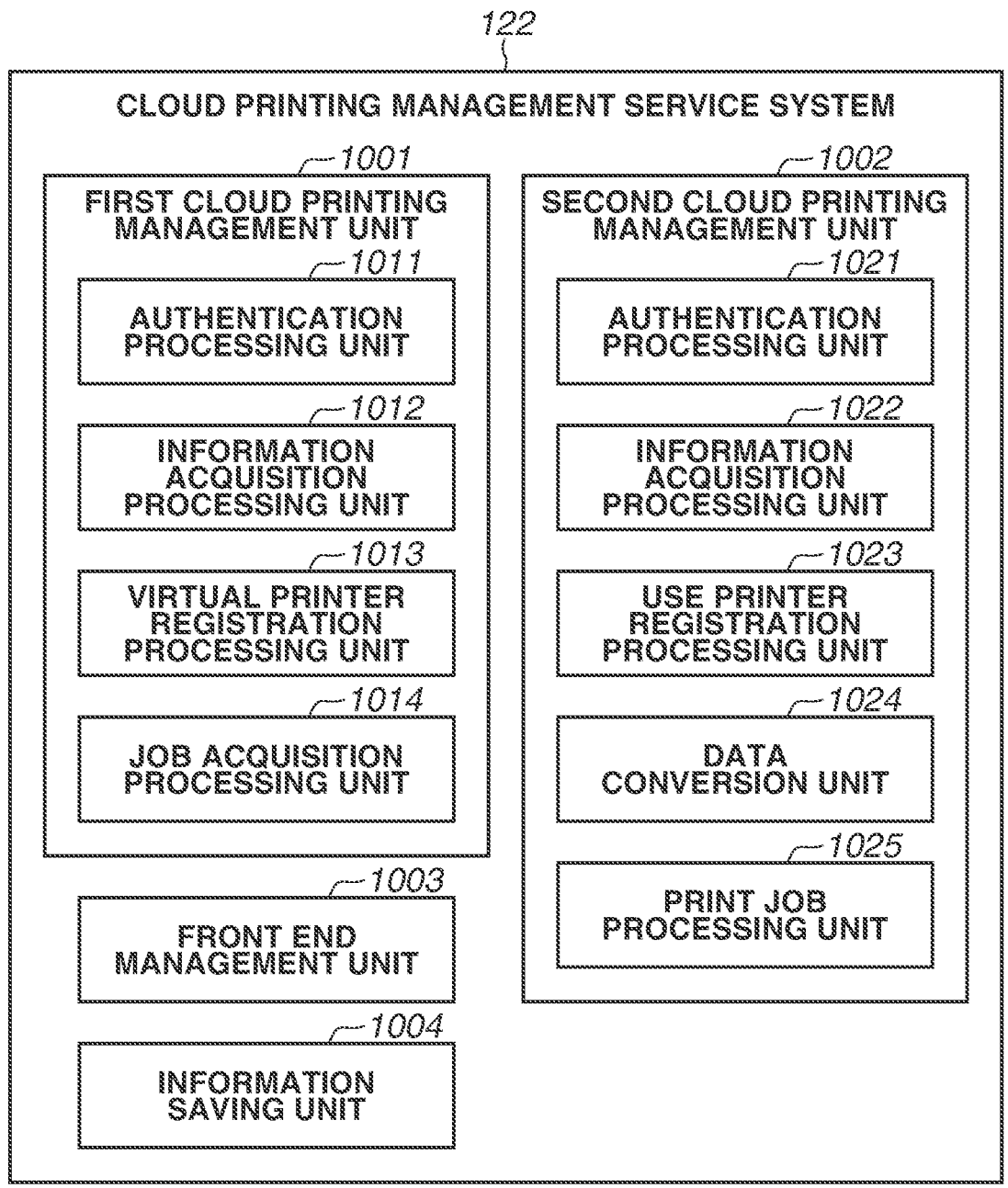
FIG. 10 is a functional block diagram illustrating a software configuration of the cloud printing management service.

FIG. 10 is a functional block diagram illustrating a software configuration of the cloud printing management service system 122 according to the present exemplary embodiment. In the following description, each piece of software and each functional block may be described to perform each process, but actually, each function is achieved by the CPU 211 executing a corresponding program.

The cloud printing management service system 122 includes a first cloud printing management unit 1001, a second cloud printing management unit 1002, a front end management unit 1003, and an information saving unit 1004. The first cloud printing management unit 1001 mainly performs processing related to the first cloud printing service system 120. The first cloud printing management unit 1001 includes an authentication processing unit 1011, an information acquisition processing unit 1012, a virtual printer registration processing unit 1013, and a job acquisition processing unit 1014. The authentication processing unit 1011 issues an authentication request to the first cloud printing service system 120 or requests and acquires a token for using the first cloud printing service system 120. Using the token acquired by the authentication processing unit 1011, the information acquisition processing unit 1012 acquires information regarding a printer registered in the first cloud printing service system 120. The virtual printer registration processing unit 1013 receives an instruction from the administrator and causes the first cloud printing service system 120 to register a virtual printer. Information regarding the registered virtual printer (virtual printer information) is saved in the information saving unit 1004. The job acquisition processing unit 1014 acquires a print job transmitted from an information processing apparatus of the user to the first cloud printing service system 120 and reserved in the first cloud printing service system 120 by the user selecting the virtual printer.

The second cloud printing management unit 1002 mainly performs processing related to the second cloud printing service system 121. The second cloud printing management unit 1002 includes an authentication processing unit 1021, an information acquisition processing unit 1022, a use printer registration processing unit 1023, a data conversion unit 1024, and a print job processing unit 1025. The authentication processing unit 1021 issues an authentication request to the second cloud printing service system 121 or requests and acquires a token for using the second cloud printing service system 121. Using the token acquired by the authentication processing unit 1021, the information acquisition processing unit 1022 acquires information regarding a printer registered in the second cloud printing service system 121 from the second cloud printing service system 121.

The information regarding the printer is transmitted from the printer when a registration process for registering the printer in the second cloud printing service system 121 is performed.

The use printer registration processing unit 1023 saves a printer registered in the second cloud printing service system 121 (a printer that can be used in the second cloud printing service system 121) and a virtual printer registered in the first cloud printing service system 120 in association with each other in the information saving unit 1004. Information regarding the printing apparatus that can be used in the second cloud printing service system 121 (printer information) can be acquired from the second cloud printing service system 121 via the information acquisition processing unit 1022. Information indicating the association between the virtual printer registered in the first cloud printing service system 120 and the use printer registered in the second cloud printing service system 121 is saved in the information saving unit 1004. In other words, the virtual printer information regarding the virtual printer registered in the first cloud printing service system 120 and the printer information regarding the printer registered in the second cloud printing service system 121 are saved in association with each other in the information saving unit 1004.

The data conversion unit 1024 converts a print job acquired from the first cloud printing service system 120 by the job acquisition processing unit 1014 into data in a format that can be interpreted by the second cloud printing service system 121. In other words, the data conversion unit 1024 generates a print job with the data format converted. The print job processing unit 1025 transmits the print job including the data converted by the data conversion unit 1024 to the second cloud printing service system 121. The front end management unit 1003 provides control for the administrator or the user to give an instruction to perform a desired operation, or provides a user interface (UI) for controlling the display of registration information or the state in response to an instruction, to the administrator or the user logged in with user authority.

With the above configuration, the cloud printing management service system 122 causes the first cloud printing service system 120 to register a virtual printer. Then, the cloud printing management service system 122 saves information regarding the virtual printer registered in the first cloud printing service system 120 and information regarding a printing apparatus registered in the second cloud printing service system 121 in association with each other. In this way, through the second cloud printing service system 121, the printer can receive and print a print job issued to the virtual printer in the first cloud printing service system 120 by the user.

<Information Managed by Cloud Printing Service>

FIG. 4 is a table schematically illustrating an example of typical information among various pieces of setting information managed by the first cloud printing service system 120 according to the present exemplary embodiment. The first cloud printing service system 120 is configured to be used by a group such as a plurality of companies and is configured so that a certain company cannot view information regarding another company. A single group is referred to as a "tenant (directory)". FIG. 4 illustrates setting information regarding a tenant with the name "XYCompany".

A setting 401 is an administrator name and stores, as a corresponding value, user identification (ID) with an administrator authority having authority to change various settings of this tenant. As the value of the administrator name, a plurality of user IDs may be stored. The administrator authority indicates a user who permits the registration of a printing apparatus in the first cloud printing service system 120, and a user having the administrator authority is sometimes referred to as an "administrator". A user authority is more limited authority than the administrator authority. For example, settings that can be changed by the administrator authority (e.g., the values of settings 404, 405, and 406) cannot be changed by the user authority.

In the tenant illustrated in FIG. 4, two printers, i.e., a printer with the name "Printer 1" and a printer with the name "Printer 2", are registered. A "printer" as used herein is a virtual printer registered in the first cloud printing service system 120, and a print job based on a print request issued by the user specifying the virtual printer is accumulated in the corresponding virtual printer. Then, if an acquisition request to acquire the print job is received from the cloud printing management service system 122, the virtual printer transmits the print job, and the print job is deleted from the virtual printer. In the first cloud printing service system 120, not only a virtual printer but also a printer (printing apparatus 111) supporting the first cloud printing service system 120 can be registered. In other words, information regarding the printing apparatus 111 can be registered in the first cloud printing service system 120, and the first cloud printing service system 120 can transmit a print job to the printing apparatus 111.

In the first cloud printing service system 120, three or more printers can also be registered. In this case, as many pieces of information as the number of registered printers are stored. A setting 402 is a printer name and stores the name of a printer as a corresponding value. A setting 403 is a device ID and stores an ID uniquely identifying the printer as a corresponding value. A setting 404 is a shared setting, and a value indicating whether the registered printer is in a state where the registered printer can be used by another user (shared state) is set. A setting 405 is initial settings and indicates print settings in a default state when printing is performed using this printer in the first cloud printing service system 120. These print settings can be changed by a user having the administrator authority.

A setting 406 indicates a user who can use the registered printer, and indicates a user who can use the printer registered in the first cloud printing service system 120. In this case, two users (users having the user authority) with the names "UserA" and "UserB" are registered. Alternatively, three or more users may be registered. The values of the settings 404, 405, and 406 can be changed by the administrator. A setting 407 is a value indicating the printer capability and stores, as corresponding values, print settings that can be specified in the printer and the setting values of the print settings. A setting 408 indicates the printer status and stores, as a corresponding value, the current status of an actual printing apparatus associated with information regarding the registered printer.

Thus, this status changes based on the state of the actual printing apparatus associated with the registered printer.

As described above, in the first cloud printing service system 120, it is possible to register one or more printers. Further, it is possible to set a user who can use each printer.

<Sequence of Registering Virtual Printer in First Cloud Printing Service System>

Figure 5:
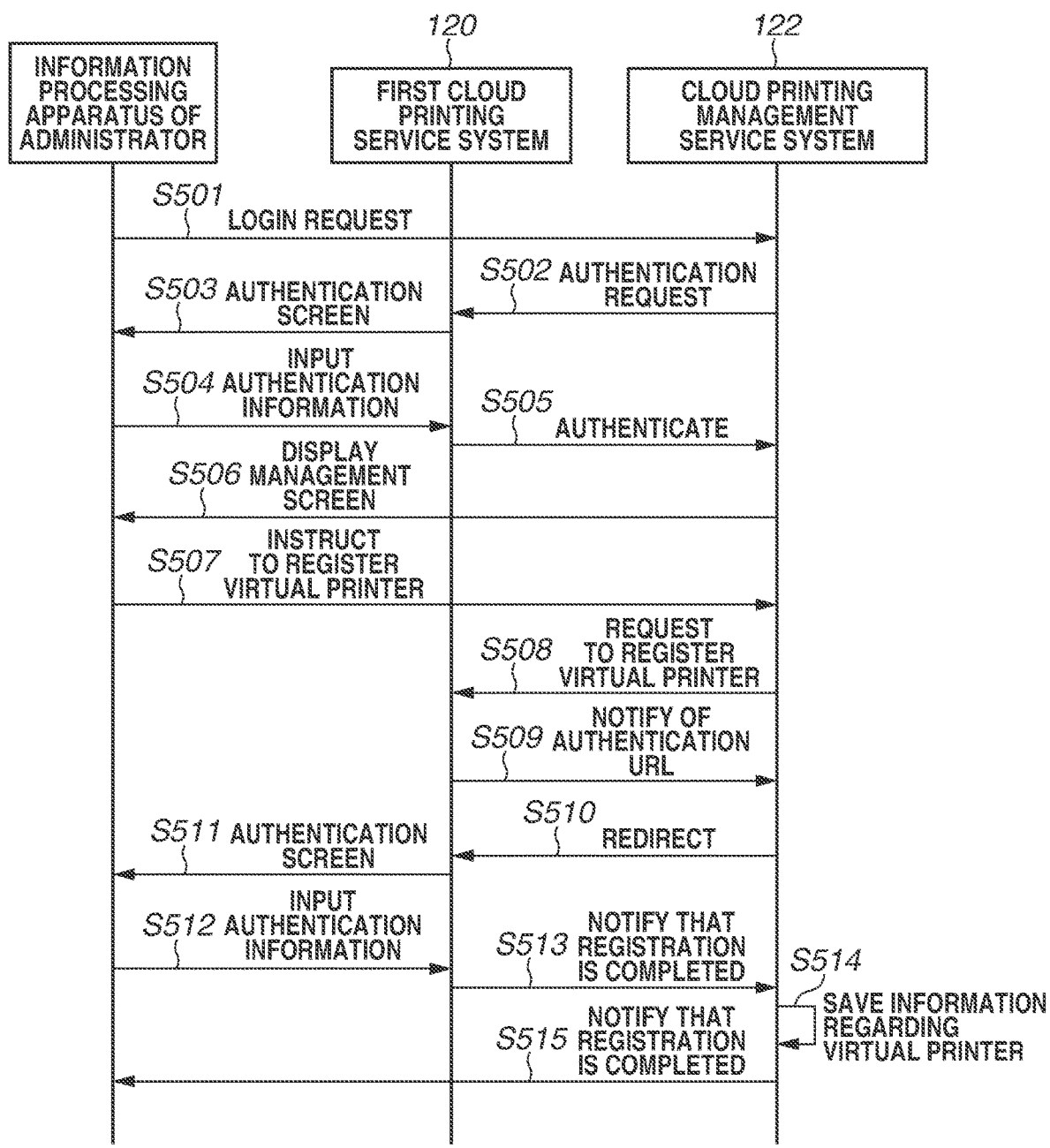
FIG. 5 is a sequence diagram illustrating a flow of registering a virtual printer in the first cloud printing service.

A description is given of a method for registering a virtual printer in the first cloud printing service system 120. FIG. 5 is a sequence diagram illustrating a flow of registering a virtual printer in the first cloud printing service system 120 according to the present exemplary embodiment. In the following description, each piece of software and each functional block may be described to perform each process, but actually, each function is achieved by the CPU 211 executing a corresponding program. In FIG. 5, an information processing apparatus of the administrator is any of the apparatuses included in the information processing apparatus 130 in FIG. 1.

In step S501, based on an instruction from the administrator, the information processing apparatus of the administrator makes a login request to the cloud printing management service system 122. The cloud printing management service system 122 according to the present exemplary embodiment requires authentication by the first cloud printing service system 120 for a login. To this end, in step S502, the cloud printing management service system 122 issues an authentication request to the first cloud printing service system 120.

In step S503, the first cloud printing service system 120 transmits information regarding an authentication screen of the first cloud printing service system 120 to the information processing apparatus of the administrator, and the authentication screen is displayed on the information processing apparatus of the administrator.

In step S504, the administrator inputs a user ID and a password of an account having the administrator authority on the first cloud printing service system 120 as authentication information, and the authentication information is transmitted to the first cloud printing service system 120.

In step S505, the first cloud printing service system 120 verifies the input authentication information and determines whether the authentication information is authentication information regarding the account having the administrator authority on the first cloud printing service system 120. As a result of the determination, if the authentication information is authenticated, the first cloud printing service system 120 notifies the cloud printing management service system 122 that the authentication information is authenticated.

In step S506, based on the reception of the authentication notification, the cloud printing management service system 122 transmits information regarding a management screen for the administrator to the information processing apparatus of the administrator. The management screen is displayed on the information processing apparatus of the administrator.

FIG. 11A is a diagram illustrating an example of a management screen 1101 provided by the cloud printing management service system 122. Through the management screen, the administrator can confirm and delete a virtual printer registered in the first cloud printing service system 120 or newly register a virtual printer. The administrator inputs to a text box 1111 the printer name of a virtual printer to be newly registered and presses a button 1112, and thereby can register the new virtual printer.

In step S507, a registration instruction to register a virtual printer in the first cloud printing service system 120 that is input to the management screen 1101 is transmitted to the cloud printing management service system 122.

In step S508, the cloud printing management service system 122 having received the registration instruction makes a registration request to register the virtual printer to the first cloud printing service system 120.

The registration request includes information such as the printer name (setting 402) and the device ID (setting 403). These pieces of information are specified by the administrator when the administrator gives the registration instruction. However, the cloud printing management service system 122 may determine these pieces of information without specifying the administrator. To register the printer in the first cloud printing service system 120, authentication by a user having the registration authority (i.e., a user having the administrator authority) is required. Thus, in step S509, the first cloud printing service system 120 transmits a Uniform Resource Locator (URL) to be used to access an authentication page as a response to the registration request in step S508.

In step S510, the cloud printing management service system 122 redirects to the first cloud printing service system 120 so that the administrator having given the registration instruction performs the authentication on the first cloud printing service system 120. Then, in step S511, the first cloud printing service system 120 transmits information regarding an authentication screen to the information processing apparatus of the administrator, and the authentication screen is displayed on the information processing apparatus of the administrator.

In step S512, the administrator inputs a user ID and a password of an account having the administrator authority on the first cloud printing service system 120 as authentication information to the authentication screen, and the authentication information is transmitted to the first cloud printing service system 120. The first cloud printing service system 120 verifies the validity of the user ID and the password input by the administrator and verifies whether the user ID corresponds to the administrator authority having the registration authority.

As a result, if the authentication information is authenticated, the first cloud printing service system 120 registers the printer that the first cloud printing service system 120 is requested to register. More specifically, the first cloud printing service system 120 registers information regarding the virtual printer (printer information) for which the cloud printing management service system 122 has made the registration request to the first cloud printing service system 120. In this case, a configuration is employed in which authentication is performed again in steps S511 and S512 to register the printer. However, if the authentication for registering the printer can be substituted by the authentication step in steps S502 to S505, a configuration is also possible in which the authentication step in steps S511 and S512 can be omitted.

If the registration of the printer is completed, then in step S513, the first cloud printing service system 120 notifies the cloud printing management service system 122, which has made the request, of information indicating that the registration is completed. The cloud printing management service system 122 receives the notification from the first cloud printing service system 120. Then, in step S514, the cloud printing management service system 122 saves information regarding the registered virtual printer. The information to be saved will be described below with reference to FIG. 8.

Finally, in step S515, the cloud printing management service system 122 transmits, to the information processing apparatus of the administrator, information indicating that the registration is completed. The information processing apparatus of the administrator receives this information and notifies the administrator that the registration is completed. As the notification method, a method for performing, on a page displayed on the cloud printing management service system 122, display indicating that the registration is completed is possible. However, it is not limited to this.

By the flow described above, based on a request from the cloud printing management service system 122, a virtual printer simulating a printer supporting the first cloud printing service system 120 is registered in the first cloud printing service system 120. The administrator accesses the first cloud printing service system 120 and thereby can set a user who can use the registered virtual printer (setting 406 in FIG. 4). A user registered as the user who can use the registered virtual printer by the administrator logs into the first cloud printing service system 120 with an account having the user authority registered in the first cloud printing service system 120 and is authenticated, and thereby can make a printing request to the virtual printer.

A virtual printer to be registered by the administrator does not need to be a single virtual printer. As indicated by the printer capability (setting 407) in FIG. 4, functions available in a registered virtual printer are registered. All users who use the same virtual printer can make print settings in the ranges of the registered functions. On the other hand, the functions of printing apparatuses used by the users differ depending on the models, and therefore, there is a possibility that the functions of each model cannot be used due to the use of the common virtual printer. For example, in a case where there are a printer having a two-sided printing function and a printer without the two-sided printing function, and if only functions available in all the printers can be set for the virtual printer, the two-sided printing function cannot be used even in the printer having the two-sided function. The administrator can also register all the assumed functions so that all the assumed functions can be used in the virtual printer. However, in this case, a function that cannot be used can also be set. Thus, for example, the administrator may register two virtual printers, i.e., a virtual printer for which two-sided printing can be set and a virtual printer for which two-sided printing cannot be set, and the user may switch which of the virtual printers is to be used depending on the printing apparatus owned by the user. Further, the administrator can also register in advance virtual printers for respective users or as many virtual printers as the number of printing apparatuses to be associated.

<Sequence of Registering Printing Apparatus in Second Cloud Printing Service System>

Figure 6:
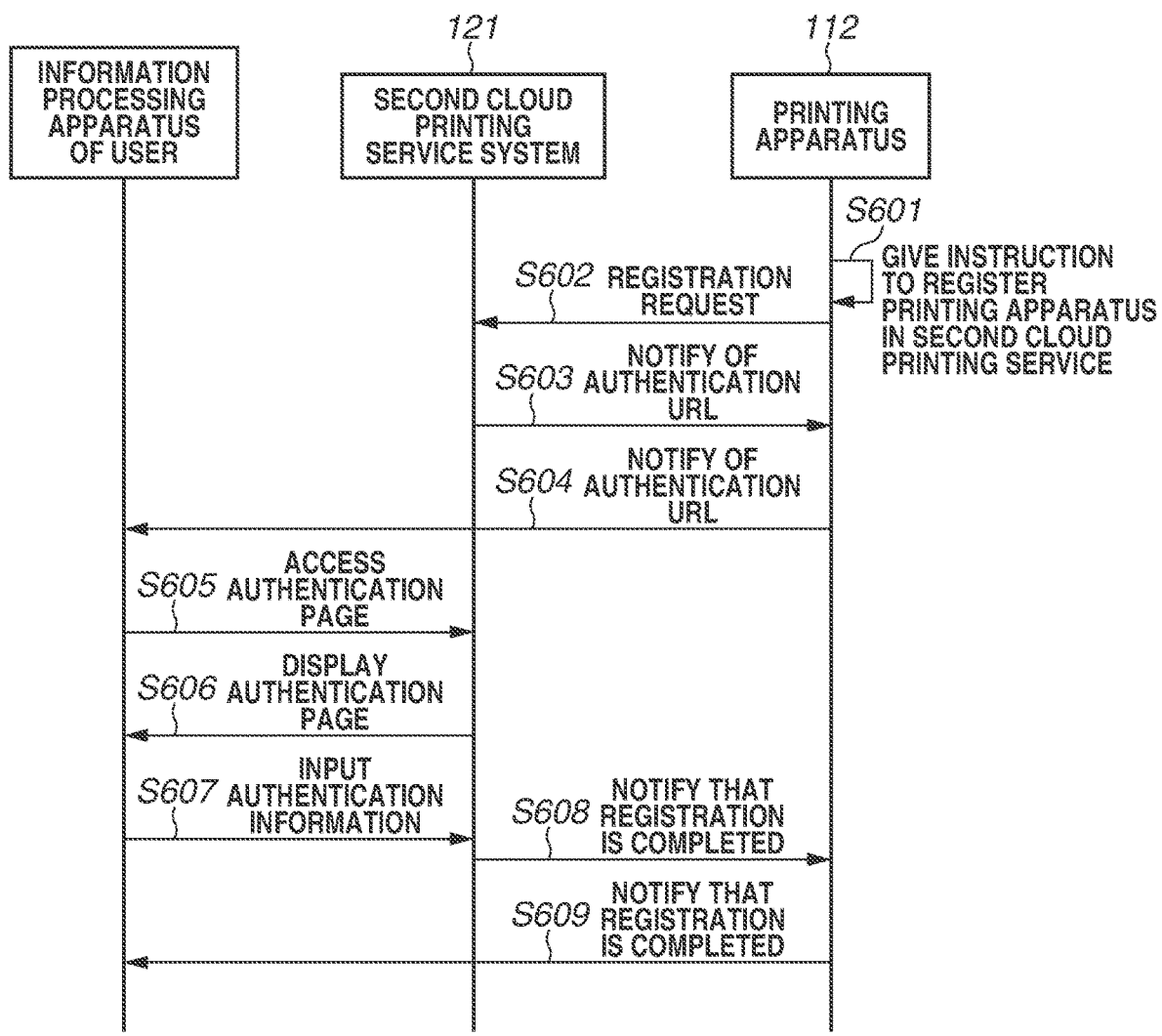
FIG. 6 is a sequence diagram illustrating a flow of registering a printing apparatus in a second cloud printing service.

Next, a description is given of a method for registering a printing apparatus in the second cloud printing service system 121. FIG. 6 is a sequence diagram illustrating a flow of registering a printing apparatus in the second cloud printing service system 121 according to the present exemplary embodiment. In the following description, each piece of software and each functional block may described to perform each process, but actually, each function is achieved by the CPU 211 executing a corresponding program. In FIG. 6, an information processing apparatus of the user is any of the apparatuses included in the information processing apparatus 130 in FIG. 1.

In step S601, by operating the printing apparatus 112, the user gives an instruction to register the printing apparatus 112 in the second cloud printing service system 121. The printing apparatus 112 receives the instruction from the user. Then, in step S602, the printing apparatus 112 accesses the second cloud printing service system 121 and makes a registration request.

In step S603, the second cloud printing service system 121 transmits a URL to be used to access an authentication page to the printing apparatus 112. In step S604, the printing apparatus 112 transmits the URL to the information processing apparatus of the user. Although a description is given of a method in which the printing apparatus 112 notifies the information processing apparatus of the user of the URL, the notification method is not limited to this. For example, the printing apparatus 112 may display this URL on a display unit included in the printing apparatus 112, thereby notifying the user of the URL. Alternatively, the printing apparatus 112 may print the URL, thereby notifying the user of the URL. In a case where the printing apparatus 112 includes a web browser, the printing apparatus 112 may display on the display unit an authentication screen as a page at the notified URL. In this case, the user can also input authentication information to the authentication screen displayed on the display unit of the printing apparatus 112. In other words, the processes of step S605 and the subsequent steps performed by the information processing apparatus of the user can also be performed by the printing apparatus 112.

In step S605, based on the notified URL, the information processing apparatus of the user accesses the authentication page of the second cloud printing service system 121. In step S606, the second cloud printing service system 121 displays the authentication page (authentication screen) to the user. In case that the user does not have an account on the second cloud printing service system 121, it is desirable that a link to account creation is provided on the authentication screen displayed on the second cloud printing service system 121. In step S607, the user inputs a user ID and a password of an account on the second cloud printing service system 121 as authentication information.

In step S607, the second cloud printing service system 121 verifies the input authentication information. As a result, if the authentication information is authenticated, the second cloud printing service system 121 registers the printing apparatus 112 that the second cloud printing service system 121 is requested to register. In other words, the second cloud printing service system 121 registers information regarding the printing apparatus 112 (printer information) for which the registration request has been made to the second cloud printing service system 121.

If the registration is completed, then in step S608, the second cloud printing service system 121 notifies the printing apparatus 112 of information indicating that the registration is completed. In step S609, the printing apparatus 112 notifies the user that the registration is completed. Although the user is notified of the information by displaying the information on the information processing apparatus of the user, as the notification method, the user may be notified of the information by displaying the information on the display unit included in the printing apparatus 112.

By the flow described above, the user logs into the second cloud printing service system 121 with an account registered in the second cloud printing service system 121 and is authenticated, and thereby can give a printing instruction to the printing apparatus 112 via the second cloud printing service system 121.

<Flow of Registering Printing Apparatus in Cloud Printing Management Service>

Figure 7:
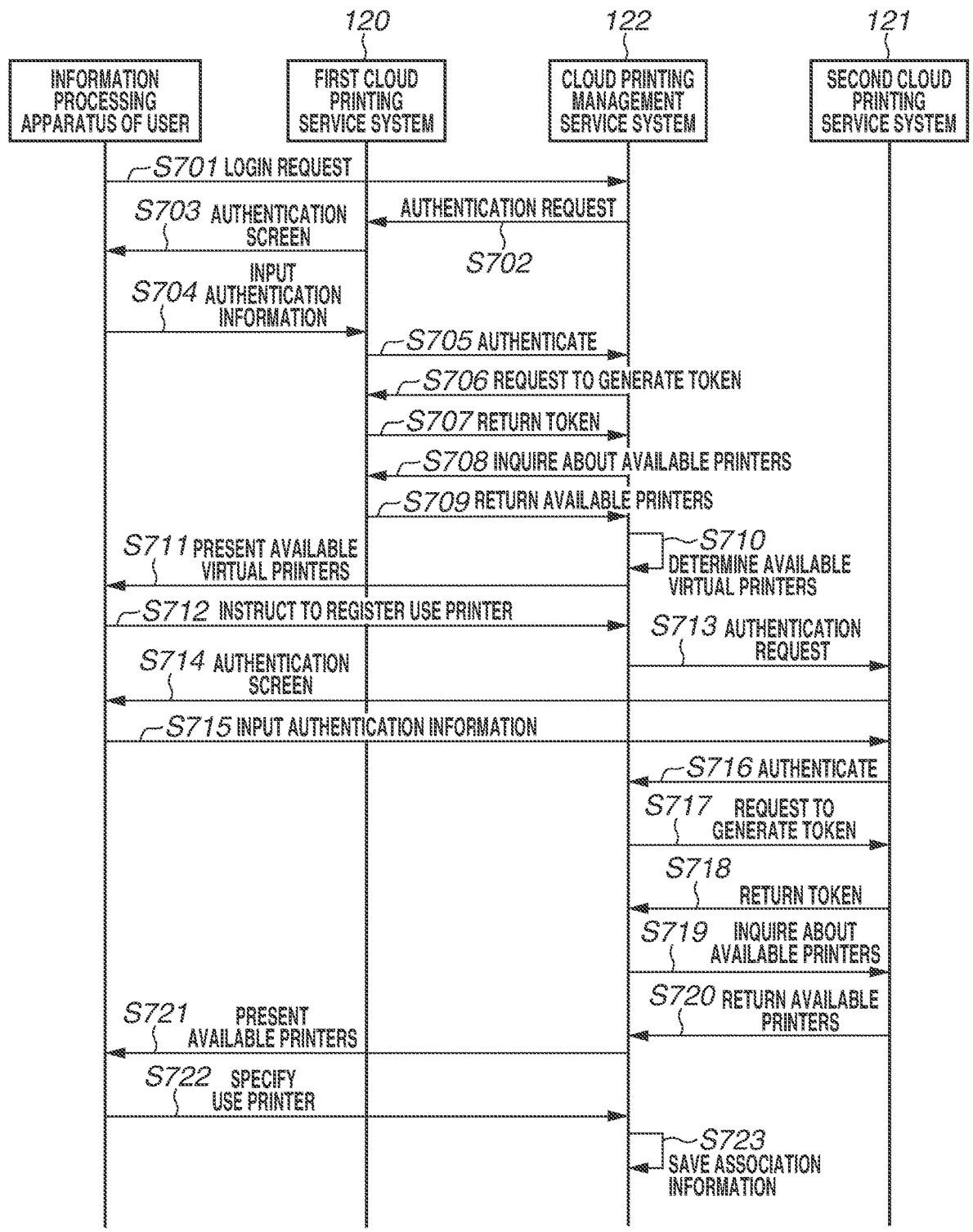
FIG. 7 is a sequence diagram illustrating a flow of associating a virtual printer and a printer registered in the second cloud printing service.

Next, a description is given of a method for associating a virtual printer registered in the first cloud printing service system 120 based on a request from the cloud printing management service system 122, and a printing apparatus registered in the second cloud printing service system 121. FIG. 7 is a sequence diagram illustrating a flow of associating a printing apparatus registered in the second cloud printing service system 121 with a virtual printer registered in the first cloud printing service system 120. In the following description, each piece of software and each functional block may be described to perform each process, but actually, each function is achieved by the CPU 211 executing a corresponding program. In FIG. 7, the information processing apparatus of the user is any of the apparatuses included in the information processing apparatus 130 in FIG. 1.

In step S701, based on an instruction from the user, the information processing apparatus of the user makes a login request to the cloud printing management service system 122. The cloud printing management service system 122 according to the present exemplary embodiment needs authentication by the first cloud printing service system 120 for a login. To this end, in step S702, the cloud printing management service system 122 issues an authentication request to the first cloud printing service system 120.

In step S703, the first cloud printing service system 120 transmits information regarding an authentication screen of the first cloud printing service system 120 to the information processing apparatus of the user, and the authentication screen is displayed on the information processing apparatus of the user.

In step S704, the user inputs user ID and a password of an account registered in the first cloud printing service system 120 as authentication information, and the authentication information is transmitted to the first cloud printing service system 120.

In step S705, the first cloud printing service system 120 verifies the input authentication information and determines whether the authentication information is authentication information of the account registered in the first cloud printing service system 120. As a result of the determination, if the authentication information is authenticated, the first cloud printing service system 120 notifies the cloud printing management service system 122 of information indicating that the authentication information is authenticated.

In step S706, the cloud printing management service system 122 issues to the first cloud printing service system 120 a request to generate a token required to access a resource of the first cloud printing service system 120. In step S707, the first cloud printing service system 120 transmits to the cloud printing management service system 122 a token including authority information regarding authority given to the user ID input in step S704. Then, in step S708, using the acquired token, the cloud printing management service system 122 inquires of the first cloud printing service system 120 about registered printers that can be used by the user.

In step S709, the first cloud printing service system 120 transmits, to the cloud printing management service system 122, information regarding printers that can be used with the authenticated user ID among printers registered in the first cloud printing service system 120. The information regarding the printers to be transmitted may include not only information regarding a virtual printer registered in the first cloud printing service system 120, but also information regarding a physical printer registered in the first cloud printing service system 120. The physical printer registered in the first cloud printing service system 120 refers to, for example, the printing apparatus 111 supporting the first cloud printing service system 120.

In step S710, the cloud printing management service system 122 extracts information regarding virtual printers registered based on requests from the cloud printing management service system 122 from among the pieces of information acquired in step S709 regarding the printers that can be used. In this way, printers that can be used by the user via the cloud printing management service system 122 are determined. In step S711, based on the information determined in step S710, the cloud printing management service system 122 presents to the user the printers that can be used. More specifically, the cloud printing management service system 122 transmits, to the information processing apparatus of the user, information of a user menu screen in which the printers that can be used are displayed.

FIG. 11B is a schematic diagram illustrating an example of a user menu screen 1102 provided by the cloud printing management service system 122. Through the user menu screen 1102, the user can confirm a printer that can be used by the user among virtual printers registered in the first cloud printing service system 120 by the administrator. FIG. 11B illustrates a state where two virtual printers are registered. A print button 1122 displayed next to each printer name is an item for giving a print instruction. After the processing in FIG. 7 is completed, and if the print button 1122 is pressed, this triggers the acquisition of a print job present in the first cloud printing service system 120 by the cloud printing management service system 122 and the transmission of the print job to the second cloud printing service system 121. An edit button 1121 is an item for newly registering or editing a printer to be associated with the virtual printer. FIG. 11C to be described below illustrates a screen displayed by pressing the edit button 1121 in FIG. 11B. A description is given below of a case where the edit button 1121 is pressed on the user menu screen 1102 in FIG. 11B. The edit button 1121 corresponds to a user instruction to associate a virtual printer that can be used in the first cloud printing service system 120 and a printer registered in the second cloud printing service system 121.

In step S712, based on a user instruction, the information processing apparatus of the user instructs the cloud printing management service system 122 to register the association of a use printer. The "use printer" refers to a printer registered in the second cloud printing service system 121. To access the second cloud printing service system 121, the user needs to be authenticated by the second cloud printing service system 121. To this end, in step S713, the cloud printing management service system 122 issues an authentication request to the second cloud printing service system 121.

In step S714, the second cloud printing service system 121 transmits information regarding an authentication screen to the information processing apparatus of the user, and the authentication screen is displayed on the information processing apparatus of the user. In step S715, the user inputs a user ID and a password of an account registered in the second cloud printing service system 121 as authentication information.

The second cloud printing service system 121 verifies the input authentication information input in step S715, and determines whether the authentication information is authentication information regarding the account registered in the second cloud printing service system 121. As a result of the determination, if the authentication information is authenticated, then in step S716, the second cloud printing service system 121 notifies the cloud printing management service system 122, which has made the request, that the authentication information is authenticated.

In step S717, the cloud printing management service system 122 issues to the second cloud printing service system 121 a request to generate a token for accessing a resource of the second cloud printing service system 121.

In step S718, the second cloud printing service system 121 transmits to the cloud printing management service system 122 a token including authority information regarding authority given to the user ID input in step S715. Then, in step S719, using the acquired token, the cloud printing management service system 122 inquires of the second cloud printing service system 121 about printers registered in the second cloud printing service system 121 that can be used by the user.

In step S720, the second cloud printing service system 121 transmits, to the cloud printing management service system 122, information regarding printers that can be used. In this way, in step S721, the cloud printing management service system 122 can present printers registered in the second cloud printing service system 121 by the user. More specifically, the cloud printing management service system 122 transmits, to the information processing apparatus of the user, information regarding a printer registration screen including a list of printers registered in the second cloud printing service system 121.

FIG. 11C is a diagram illustrating an example of a printer registration screen (selection screen) 1103. On the printer registration screen 1103, printers that can be used in the second cloud printing service system 121 are listed. FIG. 11C illustrates a state where two printers, i.e., a "Printer A" and a "Printer B", are registered. These two printers indicate physical printing apparatuses supporting the second cloud printing service system 121, such as the printing apparatus 112 in FIG. 1. The user selects a desired printer from among the listed printers and presses an OK button 1131, thereby giving an instruction to perform a registration process for associating the selected printer with the virtual printer registered in the first cloud printing service system 120.

In step S722, the OK button 1131 is pressed in FIG. 11C, whereby the information processing apparatus of the user issues a registration instruction to the cloud printing management service system 122. In step S723, based on a user instruction, the cloud printing management service system 122 executes a saving process for saving association information. By this saving process, information regarding the virtual printer registered in the first cloud printing service system 120 and information regarding the printer registered in the second cloud printing service system 121 are saved in association with each other in the information saving unit 1004 of the cloud printing management service system 122. The information to be saved will be described below with reference to FIG. 8.

By the above flow, it is possible to associate a virtual printer registered in the first cloud printing service system 120 via the cloud printing management service system 122 by the administrator and a printing apparatus registered in the second cloud printing service system 121 by the user. The cloud printing management service system 122 can also acquire capability information regarding the registered printing apparatus from the second cloud printing service system 121 and reflect the capability information on the setting (printer capability) 407 of the virtual printer registered in the first cloud printing service system 120. Particularly, in a case where the virtual printer is used by a single user, the printer capability of the virtual printer is updated, whereby it is possible to appropriately use the ability of the printing apparatus to be used.

<Information Managed by Cloud Printing Management Service>

Figure 8:
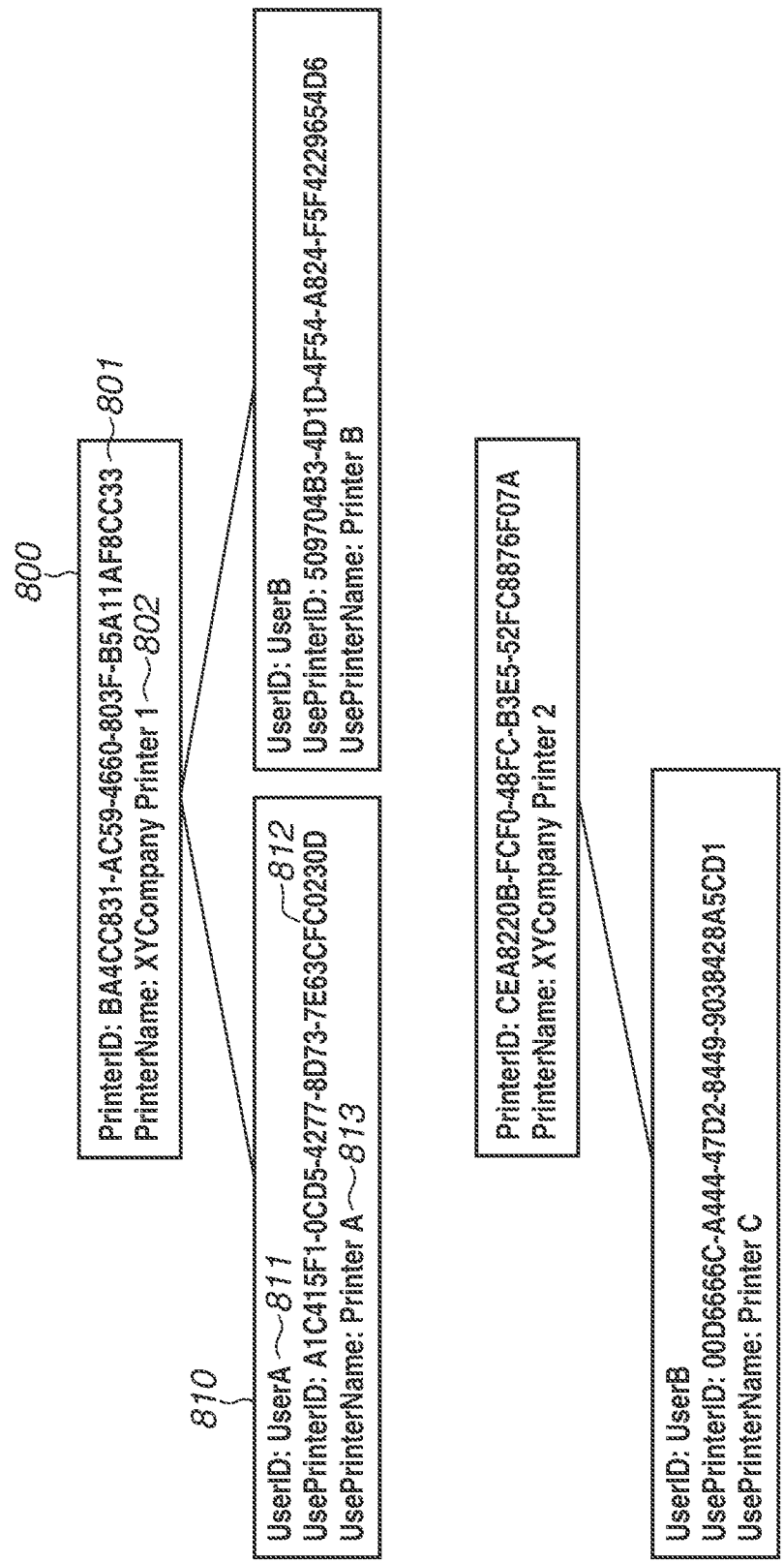
FIG. 8 is an example of information managed by a cloud printing management service.

FIG. 8 is a diagram illustrating an example of the information saved in steps S514 and S723. Virtual printer information 800 is information indicating a virtual printer registered in the first cloud printing service system 120 by the cloud printing management service system 122. The virtual printer information 800 includes "PrinterID" 801 and "PrinterName" 802. The "PrinterID" 801 is an ID for uniquely identifying a printer registered in the first cloud printing service system 120. The "PrinterName" 802 is name information regarding a virtual printer corresponding to the "PrinterID" 801. The virtual printer information 800 is registered in step S514 in the flow of registering a virtual printer in the first cloud printing service system 120.

The virtual printer information 800 includes any number of pieces of user information 810 as sub-elements. The user information 810 includes "UserID" 811, "UsePrinterID" 812, and "UsePrinterName" 813. The "UserID" 811 is an ID for uniquely identifying a user who can use the virtual printer. The "UsePrinterID" 812 is an ID for uniquely identifying a printer registered in the second cloud printing service system 121. The "UsePrinterName" 813 is name information regarding a printing apparatus corresponding to the "UsePrinterID" 812. The user information 810 is registered in step S723, which is the process of saving a printing apparatus registered in the second cloud printing service system 121 in association with a virtual printer registered in the first cloud printing service system 120.

In the example of FIG. 8, the administrator registers two virtual printers, i.e., "XYCompany Printer 1" and "XYCompany Printer 2" in the first cloud printing service system 120 through the cloud printing management service system 122. The administrator accesses the first cloud printing service system 120 and sets a user who can use a virtual printer registered based on a request from the cloud printing management service system 122. If the administrator sets the "UserA" as a user who can use the "XYCompany Printer 1", the "UserA" can make a print request to the "XYCompany Printer 1" registered in the first cloud printing service system 120. The "UserA" can also access the cloud printing management service system 122 and recognize that the "XYCompany Printer 1" can be used. The "UserA" assigns the "Printer A" registered in the second cloud printing service system 121 to the "XYCompany Printer 1" through the cloud printing management service system 122. In this way, a print job issued to the "XYCompany Printer 1" registered in the first cloud printing service system 120 by the "UserA" is printed by the "Printer A" via the cloud printing management service system 122 and through the second cloud printing service system 121. Next a specific printing flow will be described.

<Printing Flow Via Cloud Printing Management Service>

Figure 9:
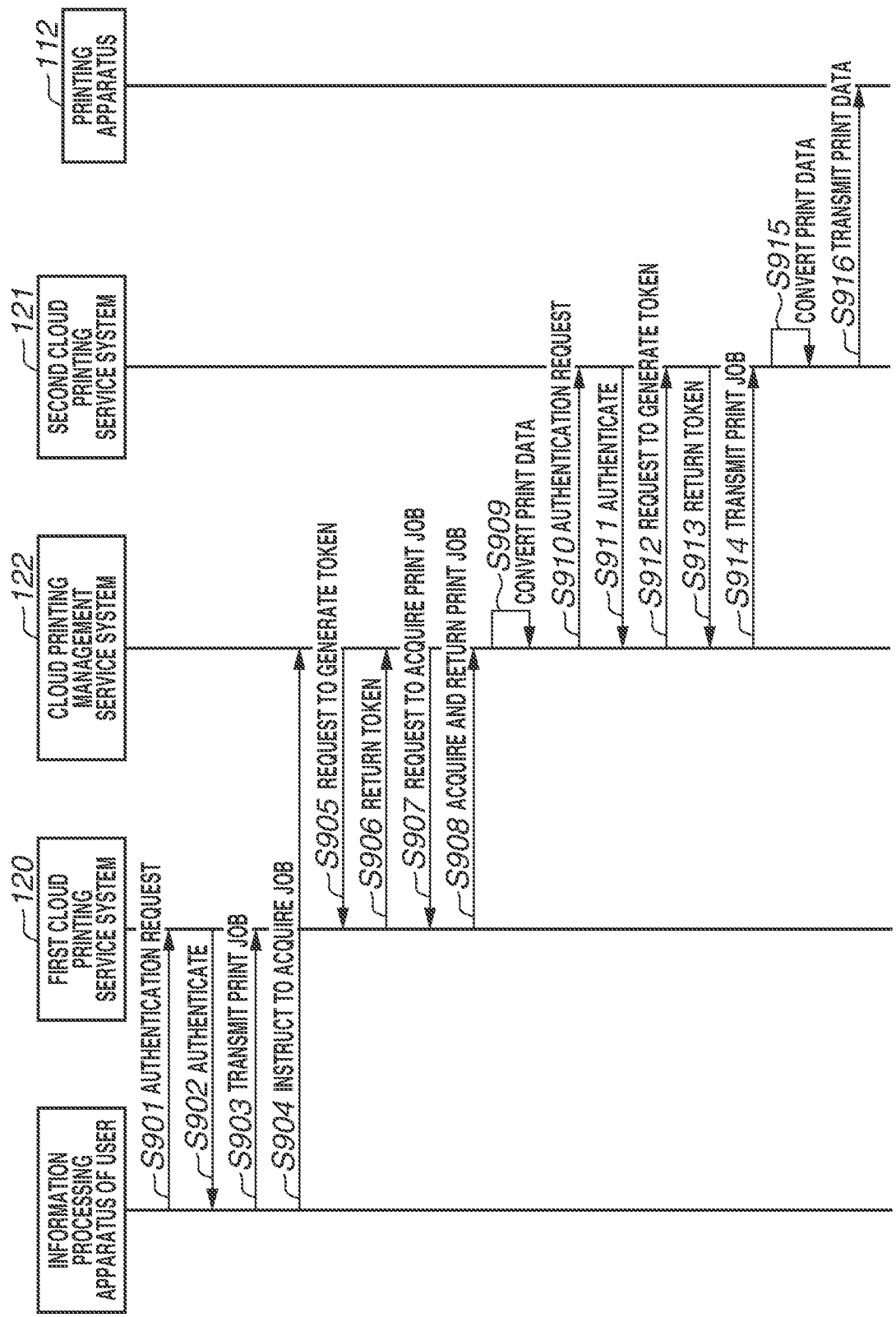
FIG. 9 is a sequence diagram illustrating a printing flow via the cloud printing management service.

FIG. 9 is a sequence diagram illustrating a printing flow via the cloud printing management service system 122. In the following description, each piece of software and each functional block may perform each process, but actually, each function is achieved by the CPU 211 executing a corresponding program. In FIG. 9, the information processing apparatus of the user is any of the apparatuses included in the information processing apparatus 130 in FIG. 1.

First, in step S901, to use the first cloud printing service system 120, the information processing apparatus of the user issues an authentication request to the first cloud printing service system 120 based on a user instruction. The authentication may be automatically performed based on information registered in advance in an operation environment. Alternatively, the authentication may be performed by the first cloud printing service system 120 providing an authentication screen, and the user inputting a user ID and a password of an account on the first cloud printing service system 120 to the authentication screen.

In step S902, the first cloud printing service system 120 performs the authentication according to the input authentication information. In this way, the user can make a print request to the first cloud printing service system 120.

In step S903, the information processing apparatus of the user transmits a print job to the first cloud printing service system 120. More specifically, on a screen of a driver function or an application provided by the OS, the user selects a target printer and instructs the target printer to perform printing, thereby transmitting a print job. The transmitted print job is received by and accumulated in a virtual printer in the first cloud printing service system 120.

Next, in step S904, the information processing apparatus of the user accesses the cloud printing management service system 122 and instructs the cloud printing management service system 122 to acquire the job. This is executed by, for example, pressing the print button 1122 of a virtual printer to which a print request has been made on the user menu screen 1102 in FIG. 11B. In the present exemplary embodiment, a configuration is described in which the cloud printing management service system 122 acquires the job from the first cloud printing service system 120. However, the present disclosure is not limited thereto. A configuration may be employed in which if a print job is stored in the first cloud printing service system 120, a notification is transmitted to the cloud printing management service system 122. In this case, a configuration is such that, in step S904, the user does not need to give the instruction, and the cloud printing management service system 122 receives a notification from the first cloud printing service system 120 and acquires the print job.

To acquire the print job stored in the first cloud printing service system 120, the cloud printing management service system 122 requires a token for accessing a resource of the first cloud printing service system 120. To this end, in step S905, the cloud printing management service system 122 transmits a request to generate the token to the first cloud printing service system 120. This token is used to access a registered device. To request the token, information received when the virtual printer is registered in the first cloud printing service system 120 is required. When the registration of the virtual printer is completed in step S513, the first cloud printing service system 120 notifies the cloud printing management service system 122 of the information required to generate the token. The cloud printing management service system 122 saves the information required to request the token together with information regarding the registered virtual printer, and thereby can request the token at a necessary timing. In the present exemplary embodiment, it is assumed that the "PrinterID" 801 in FIG. 8 is used as this information. However, if there is also other necessary information, it is desirable to save the other necessary information together when the virtual printer is registered.

In step S906, the first cloud printing service system 120 transmits to the cloud printing management service system 122 the token required to acquire the print job stored by the print request to the registered virtual printer. If the cloud printing management service system 122 acquires the token, then in step S907, the cloud printing management service system 122 transmits an acquisition request to acquire the print job to the first cloud printing service system 120. If a single virtual printer can be used by a plurality of users, the cloud printing management service system 122 adds user information to the acquisition request to acquire the job, thereby acquiring only a job of a user having accessed the first cloud printing service system 120.

In step S908, the first cloud printing service system 120 transmits the print job for the virtual printer supporting the token to the cloud printing management service system 122. If the cloud printing management service system 122 acquires the print job, then in step S909, the cloud printing management service system 122 converts print data of the acquired print job into a format that can be interpreted by the second cloud printing service system 121. For example, in a case where the page description language (PDL) of the print data acquired from the first cloud printing service system 120 is Extensible Markup Language (XML) Paper Specification (XPS), it is possible that the cloud printing management service system 122 converts the print data into PDF that can be interpreted by the second cloud printing service system 121. In a case where the print data of the print job acquired from the first cloud printing service system 120 is in a format that can be interpreted as it is by the second cloud printing service system 121, the conversion in step S909 is not necessary.

Next, in step S910, to use the second cloud printing service system 121, the cloud printing management service system 122 issues an authentication request to the second cloud printing service system 121. The authentication may be automatically performed based on information registered in advance in the cloud printing management service system 122. Alternatively, the second cloud printing service system 121 may provide an authentication screen. In this case, the authentication may be performed by the user inputting into the authentication screen a user ID and a password of an account registered in the second cloud printing service system 121 as authentication information.

In step S911, the second cloud printing service system 121 performs the authentication according to the authentication information. In this way, the user can perform printing using the printing apparatus 112 registered via the second cloud printing service system 121.

Next, in step S912, to acquire a token required to use the second cloud printing service system 121, the cloud printing management service system 122 transmits to the second cloud printing service system 121 a request to generate the token.

In step S913, the second cloud printing service system 121 transmits to the cloud printing management service system 122 the token required to cause the printing apparatus 112 registered in the second cloud printing service system 121 to perform printing.

If the cloud printing management service system 122 acquires the token, then in step S914, the cloud printing management service system 122 transmits to the second cloud printing service system 121 the print job that includes the print data with the format being converted in step S909, and that can be interpreted by the second cloud printing service system 121.

If the second cloud printing service system 121 receives the print job, then in step S915, the second cloud printing service system 121 generates print data in a format that can be interpreted by the printing apparatus 112. In other words, the second cloud printing service system 121 converts the format of the print data into a format that can be interpreted by the printing apparatus 112.

In step S916, the second cloud printing service system 121 transmits the print data to the printing apparatus 112. The printing apparatus 112 executes printing based on the print data received from the second cloud printing service system 121.

In the description of FIG. 9, a configuration is employed in which the second cloud printing service system 121 transmits print data to the printing apparatus 112. Alternatively, a configuration may be employed in which the printing apparatus 112 periodically monitors the second cloud printing service system 121. In this case, a configuration is employed in which if a print job is stored in the second cloud printing service system 121, the printing apparatus 112 acquires print data.

By the above flow, a print job for a virtual printer registered in the first cloud printing service system 120 is transmitted to the second cloud printing service system 121 via the cloud printing management service system 122. Then, the print job is printed by the printing apparatus 112 registered in the second cloud printing service system 121.

A configuration is possible in which the cloud printing management service system 122 transmits a job to the second cloud printing service system 121, and then controls the timing of the job and notifies the user of the status while confirming the state of the second cloud printing service system 121. The user is notified of the state of the job and thereby can confirm the processing situation of the job. As the notification method for notifying the user of the status, a method for displaying a screen by a front end function of the cloud printing management service system 122 is possible. However, the present disclosure is not limited thereto. In a case where a plurality of print jobs is handled, the cloud printing management service system 122 may confirm that the processing of the preceding job is completed by the second cloud printing service system 121, and then make a print request to print the next job. In this way, it is possible to reduce load on the second cloud printing service system 121. Additionally, it is determined whether printing is successful, whereby, in a case where a charging system for printing is constructed, it is also possible to correctly charge for the result of printing.

According to the present exemplary embodiment, for example, even in a case where a printing apparatus of a user's home does not support a standard specification such as the IPP-Infra, the user can cause the printing apparatus to execute printing via the first cloud printing service system 120.

In the first exemplary embodiment, a configuration is employed in which the user registers an account of the user in advance in the second cloud printing service system 121, and the registered account and a printing apparatus are registered in association with each other in the second cloud printing service system 121. Then, a virtual printer registered in the first cloud printing service system 120 and the printer registered in the second cloud printing service system 121 in association with the account on the second cloud printing service system 121 are associated with each other.

In a second exemplary embodiment, a configuration is described in which a printing apparatus registered in the second cloud printing service system 121 is used without registering the user (registering the account) in the second cloud printing service system 121. A description similar to that in the of first exemplary embodiment is omitted, and only the differences from the first exemplary embodiment are mainly described. In the present exemplary embodiment, the sequence of registering a printing apparatus in the second cloud printing service system 121 that is described in FIG. 6 in the first exemplary embodiment is not necessary. Thus, if the sequence of registering a virtual printer in the first cloud printing service system 120 in FIG. 5 is executed, the sequence in FIG. 6 can be skipped, and a sequence in FIG. 12 can be executed.

With reference to FIG. 12, a description is given of a flow of registering a printing apparatus in the cloud printing management service system 122 in the configuration of the present exemplary embodiment. FIG. 12 is a sequence diagram illustrating a flow of associating a printing apparatus registered in the second cloud printing service system 121 with a virtual printer registered in the first cloud printing service system 120. The processes of steps S701 to S712 in FIG. 12 are similar to the processes of steps S701 to S712 in FIG. 7, and therefore are not described. In the following description, each piece of software and each functional block may perform each process, but actually, each function is achieved by the CPU 211 executing a corresponding program.

If the cloud printing management service system 122 receives the registration instruction to register a printer in step S712, then in step S1201, the cloud printing management service system 122 requests the information processing apparatus 130 of the user to input a registration code. The "registration code" refers to information issued by the user giving an instruction to issue the registration code by operating the printing apparatus. If the printing apparatus receives the instruction to issue the registration code, the printing apparatus requests the second cloud printing service system 121 to issue the registration code. The printing apparatus notifies the second cloud printing service system 121 of identification information uniquely identifying the printing apparatus itself together with the request to issue the registration code. The second cloud printing service system 121 issues the registration code associated with the identification information regarding the printing apparatus and transmits the registration code to the printing apparatus. The printing apparatus notifies the user of the registration code returned from the second cloud printing service system 121. As the notification method, a method for displaying the registration code on a display included in the printing apparatus is possible. However, the present disclosure is not limited thereto. The second cloud printing service system 121 saves the registration code issued by receiving the registration code request from the printing apparatus and uses the registration code for a registration request using the registration code. The user views the notified registration code and inputs the registration code into a screen provided by the cloud printing management service system 122 and displayed on the information processing apparatus 130.

In step S1202, the information processing apparatus 130 transmits the registration code input by the user to the cloud printing management service system 122. In step S1203, the cloud printing management service system 122 makes a registration request to the second cloud printing service system 121 using the received registration code.

The second cloud printing service system 121 compares the registration code received from the cloud printing management service system 122 with the registration code saved when the registration code is issued. If the registration codes match each other, the second cloud printing service system 121 registers the printing apparatus. More specifically, information regarding the printing apparatus (the printing apparatus having made the request to issue the registration code) is registered in the second cloud printing service system 121.

If the registration of the printing apparatus is completed, then in step S1204, the second cloud printing service system 121 transmits a printer ID to be used in printing to the cloud printing management service system 122. The printer ID is used to make a print request to the printing apparatus identified by the identification information saved in association with the registration code. The cloud printing management service system 122 makes a print request together with the printer ID attached thereto and thereby can make a print request to the printing apparatus associated with the registration code via the second cloud printing service system 121.

In step S1205, the cloud printing management service system 122 executes a saving process for saving association information regarding the virtual printer and the printer ID. By this saving process, information regarding the virtual printer registered in the first cloud printing service system 120 and information regarding the printing apparatus registered in the second cloud printing service system 121 are saved in association with each other in the information saving unit 1004 of the cloud printing management service system 122.

In the present exemplary embodiment, in a case where the registration flow in FIG. 12 is performed, the authentication in steps S910 and S911 in the printing flow in FIG. 9 is performed using information for authentication assigned in advance to the cloud printing management service system 122. In this way, the user does not need to log into the second cloud printing service system 121 every time printing is performed. When the cloud printing management service system 122 transmits the print job in step S914, based on the information saved in step S1205, the cloud printing management service system 122 transmits the printer ID associated with the virtual printer to the second cloud printing service system 121. Thus, based on the received printer ID, the second cloud printing service system 121 can transmit the print job to the corresponding printing apparatus.

As described above, also in the present exemplary embodiment, even in a case where a printing apparatus does not support a standard specification such as the IPP-Infra, it is possible to perform printing via the first cloud printing service system 120.

In the first exemplary embodiment, according to the sequence illustrated in FIG. 6, the registration process for registering a printing apparatus in the second cloud printing service system 121 is performed in advance. Then, based on the sequence in FIG. 7, the process of associating a virtual printer registered in the first cloud printing service system 120 and the printing apparatus registered in the second cloud printing service system 121 is performed.

Generally, a user who uses a PC often performs printing from an application via a printer driver installed on the PC. In this case, it is possible to perform printing without using cloud printing services. Thus, it is also possible that it feels cumbersome to perform registration in the cloud printing services.

In response, in a third exemplary embodiment, a configuration is employed in which a printer driver executes the role of the second cloud printing service system 121 according to the first exemplary embodiment. Then, a cloud printing management application that assumes the role of the cloud printing management service system 122 is installed on the PCs of the administrator and the user. In this way, an effect similar to that of the first exemplary embodiment, i.e., the execution of printing via the first cloud printing service system 120, is obtained. The details are described below.

In the present exemplary embodiment, the cloud printing management application to be installed on the PCs has, as a first function, the function of registering a virtual printer in the first cloud printing service system 120. More specifically, the cloud printing management application installed on the information processing apparatus of the administrator executes the function of the cloud printing management service system 122 in FIG. 5. In other words, the information processing apparatus of the administrator functions also as the cloud printing management service system 122 in FIG. 5. In such a configuration, the cloud printing management application is notified of information required to acquire a token and acquired from the first cloud printing service system 120 when the virtual printer is registered, and the information is saved in the cloud printing management application.

The cloud printing management application has, as a second function, the function of associating a virtual printer that can be used by the user and the printer driver. More specifically, the cloud printing management application installed on the information processing apparatus of the user executes the function of the cloud printing management service system 122 in FIG. 7. In other words, the information processing apparatus of the user functions also as the cloud printing management service system 122 in FIG. 7.

The cloud printing management application has, as a third function, the function of acquiring a print job from the first cloud printing service system 120 and transmitting print data in a format that can be interpreted by the printer driver associated with the first cloud printing service system 120 to the printer driver. More specifically, the cloud printing management application installed on the information processing apparatus of the user executes the function of the cloud printing management service system 122 in FIG. 9. In other words, the information processing apparatus of the user functions also as the cloud printing management service system 122 in FIG. 9. In the present exemplary embodiment, as described above, the printer driver installed on the information processing apparatus of the user assumes the role of the second cloud printing service system 121. In other words, the information processing apparatus of the user functions also as the second cloud printing service system 121 in FIG. 9.

In such a configuration, the cloud printing management application acquires a print job from the first cloud printing service system 120 and transmits the print job to the printer driver associated with the first cloud printing service system 120 in advance. In this way, a printing apparatus supporting the printer driver can execute printing.

With the above configuration, also in the present exemplary embodiment, even in a case where a printing apparatus does not support a standard specification such as the IPP-Infra, it is possible to perform printing via the first cloud printing service system 120. The cloud printing management application may be different applications for the administrator and the user.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure includes not only a case where the functions of the above exemplary embodiments are achieved by executing a program code read by a computer, but also a case where based on an instruction from the program code, an OS operating on the computer performs a part or all of actual processing, and the functions of the above-described exemplary embodiments are achieved by the processing.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-142846, filed Aug. 26, 2020, which is hereby incorporated by reference herein in its entirety.

What is claimed is:

1. A printing system comprising:
a first server system; and
a management server system,
the first server system comprising a registration unit configured to, in a case where a request output from the management server system based on an instruction from a first user having a first authority is received, register first printer information in the first server system, and
the management server system comprising a control unit configured to, based on an instruction from a second user having a second authority that is a more limited authority than the first authority, execute a saving process for saving the first printer information registered in the first server system and second printer information regarding a printing apparatus registered in a second server system different from the first server system and the management server system in association with each other in a saving unit of the management server system,
wherein a print job output from an information processing apparatus having received a print instruction from the second user can be received by the printing apparatus via the first server system and the second server system, by executing the saving process.

2. The printing system according to claim 1,
wherein the management server system further comprises a first display control unit configured to, in a case where the first server system authenticates authentication information regarding the first user having the first authority, display a management screen, and
wherein the registration unit of the first server system registers the first printer information in the first server system, in a case where a request output from the management server system based on an instruction given by the first user on the management screen is received.

3. The printing system according to claim 1,
wherein the management server system further comprises:
an acquisition unit configured to, in a case where the first server system authenticates authentication information regarding the second user having the second authority, acquire the first printer information registered in the first server system; and
a second display control unit configured to, in a case where the second server system authenticates authentication information regarding the second server system of the second user, display a selection screen for selecting the second printer information, and
wherein the control unit saves the first printer information and the second printer information in association with each other in the saving unit, in a case where the second printer information is selected on the selection screen.

4. The printing system according to claim 1,
wherein the first server system further comprises:
a reception unit configured to receive from the information processing apparatus a print job based on a print instruction from the second user; and
a transmission unit configured to, based on a request from the management server system, transmit the print job,
wherein the management server system further comprises a conversion unit configured to receive the print job transmitted from the first server system and convert a data format of the print job, and
wherein the converted print job is received by the printing apparatus via the second server system.

5. The printing system according to claim 1, wherein a virtual printer is registered as the first printer information in the first server system.

6. The printing system according to claim 1, wherein the second printer information is registered using information acquired from the printing apparatus in the second server system.

7. A management server system comprising:
an output unit configured to, based on an instruction from a first user having a first authority, output a request to register first printer information in a first server system; and
a control unit configured to, based on an instruction from a second user having a second authority that is a more limited authority than the first authority, execute a saving process for saving the first printer information registered in the first server system and second printer information regarding a printing apparatus registered in a second server system different from the first server system and the management server system in association with each other in a saving unit of the management server system.

8. A control method for controlling a printing system that includes a first server system and a management server system, the control method comprising:

registering, in a case where a request output from the management server system based on an instruction from a first user having a first authority is received, first printer information in the first server system; and executing, based on an instruction from a second user having a second authority that is a more limited authority than the first authority, a saving process for saving the first printer information registered in the first server system and second printer information regarding a printing apparatus registered in a second server system different from the first server system and the management server system in association with each other in a saving unit of the management server system, wherein a print job output from an information processing apparatus having received a print instruction from the second user can be received by the printing apparatus via the first server system and the second server system, by executing the saving process.

* * * * *